UNITED STATES PATENT OFFICE.

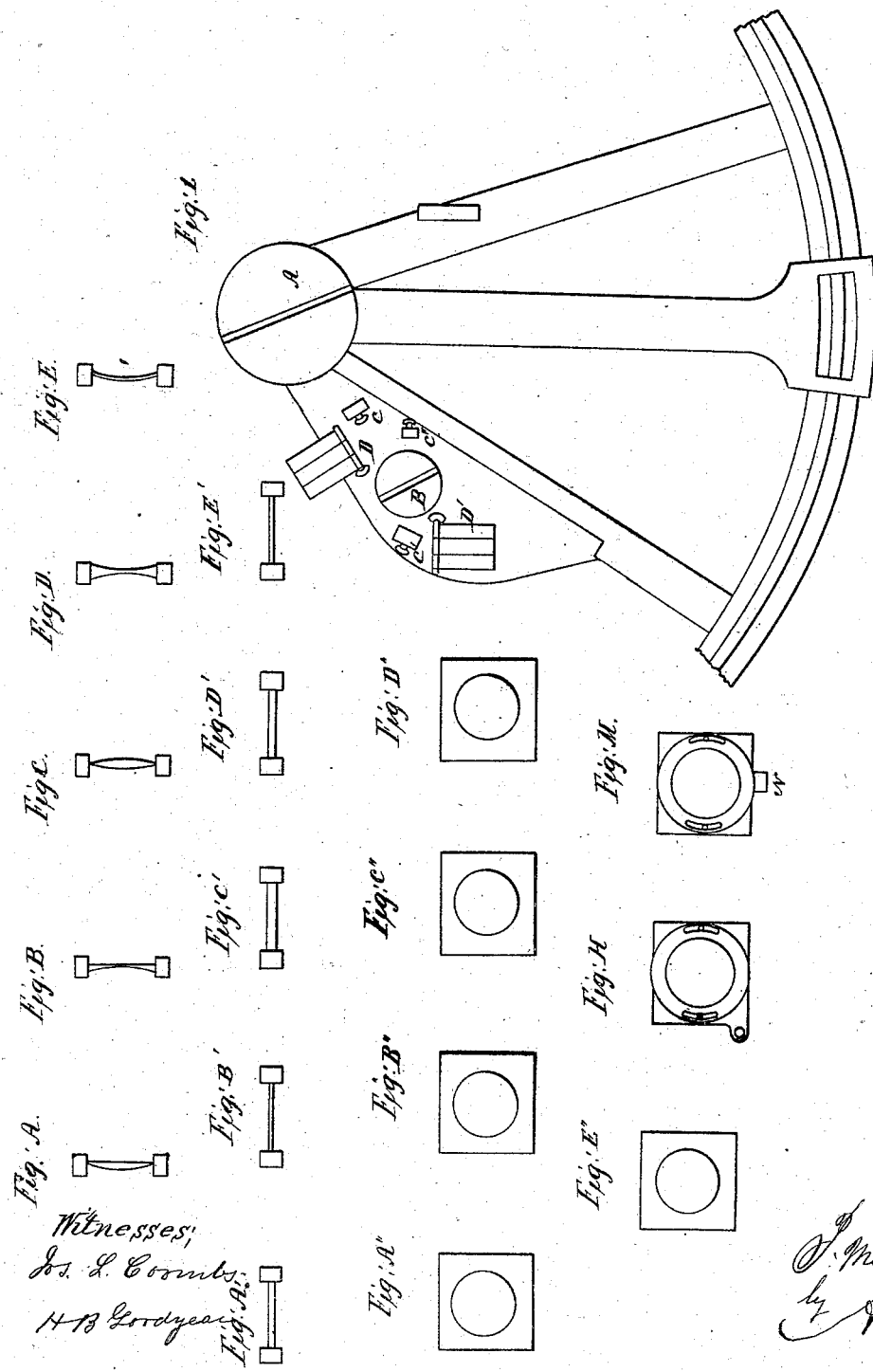

PIERRE MICHEL ALBERT LAURENT, OF ST. NAZAIRE, FRANCE.

IMPROVEMENT IN SEXTANTS.

Specification forming part of Letters Patent No. 47,778, dated May 16, 1865.

*To all whom it may concern:*

Be it known that I, PIERRE MICHEL ALBERT LAURENT, of St. Nazaire, in the Department of Loire Inférieure and Empire of France, have invented certain new and useful improvements in sextants and other similar instruments for taking observations; and I hereby declare that the following is a full, clear, and exact description of the same, reference being had to the accompanying drawings.

The object of this invention is the rendering of the measure of angular distances by means of reflecting-instruments, octants, sextants, and circles more easy and more exact than heretofore, especially in night observations.

The invention consists in improvements in these instruments which allow of the observer lengthening perpendicularly to the plane of the instrument, according to the requirements of the observation, one or other of the direct or reflected images of the terrestrial objects or heavenly bodies the angular distance of which is being measured, or even both these images. When the elongated body is a star, it appears in the form of a luminous line perpendicular to the plane of the instrument. When the heavenly body is the sun or a planet, it appears as a luminous band, more or less broad, according to its diameter. The effects just described are obtained by means of a simple apparatus, which I term an "elongating-glass," or by a modification in the shape, hitherto plane, of the mirrors used in reflecting-instruments.

The necessary apparatus for elongating images, and termed "elongating-glass," is a converging or diverging cylindrical lens placed upon the instrument normally to it and perpendicularly to the course of the luminous rays of the object to be elongated. By "cylindrical" lens I mean all lenses the faces of which are cut or ground to a cylindrical instead of a spherical curve, as ordinary lenses. The lenses may be plano-convex, plano-concave, double convex, double concave, or convexo-concave.

In the accompanying drawings, A A' A'' B B' B'' C C' C'' D D' D'' E E' E'' represent these different glasses in their frames. A B C D E are cross-sections of the elongating-glasses. A' B' C' D' E' are transverse sections through a plan parallel to the generators of the cylindrical surfaces. A'' B'' C'' D'' E'' are longitudinal sections of the elongating-glasses. The interposition of such a glass between the eye and the heavenly body or a terrestial object will have the effect of longating more or less, according to its focal length, (its distance to the eye and the opening of the pupil,) the image of the object or body in a perpendicular direction to the generators of the cylindrical surface of the lens. By placing upon a reflecting-instrument an elongating-glass, the generators of which are parallel to its plane, the body or object seen through this elongating-glass will present to the eye those of its edges that are parallel to the plane of the instrument. Those precisely between which contact is established will preserve all their sharpness, whether observed with the naked eye or through a glass.

The elongating-glasses for objects or bodies seen directly and by reflection at the same time are placed between the eye and the small mirror B—say, for example, at C'', Fig. 1.

The frames for holding the elongated glasses may be fixed to the instrument, and movable or hinged, as D and D', Fig. 1. This arrangement allows the observer to move into the path of the luminous rays the particular elonating-glass suitable for the observation. The frames are then similar to that indicated at Fig. H. The frames may also be independent of the instrument, and are then similar to that shown at Fig. M. The tail N is introduced into one or other of the bodies C C' C'', Fig. 1.

The frames are constructed in manner to allow the observer by a slight rotary motion of the lens to re-establish the parallelism of its generators with or to the plane of the instrument. This is indispensable to exactitude in observations. Figs. H and M show one of the arrangements for fulfilling this condition.

The dimension or opening to be given to the elongating-glasses is determined by the same rule as that which fixes the dimension of the colored glasses—that is to say, the opening or field of these glasses must be such that all the luminous rays that the deformed body sends to the eye may pass through them, and without their intercepting any of them. The focal length to be given to the elongating-glasses depends upon the angle that the image is desired to subtend in the eye upon the distance of the lens to the eye and on the opening or diameter of the pupil.

Experience will dictate better than all theoretical formula the most suitable focal lengths to be given to the elongating-glasses.

The light of the body elongated diminishing all things equal in proportion to its elongation, it is advisable to furnish each instrument with a series of elongating-glasses of different powers, in order that the observer may select that most suitable for his observation. Again, the elongation may be varied by altering the distance between the eye and the elongating-glass, if the observation is with the naked eye, or between this glass and the object of the telescope, if a telescope is used. To measure the angular height of a star above the horizon of the sea, look directly to the horizon and place an elongating glass between the large and small mirrors, when the star will be brought in the form of a luminous line, perfectly sharp, without irradiation and without trepidation, to rest upon the line of the horizon. To measure the angular distance from the moon to a star, look directly at the latter and place an elongating-glass behind the small mirror. The lighted edge of the moon, which will retain her natural shape, will be brought to tangent on the linear image of the star. To measure in the artificial horizon the height of a star, place an elongating-glass between the eye and the small mirror, and the linear image of the star seen by reflection in the small mirror will be brought, suppose, over the linear image of the same star seen in the artificial horizon. These various observations afford a degree of exactitude not attainable without the aid of elongating-glasses between the large and small mirrors being arbitrary it may be supposed as the extreme to be fixed on one of the plain faces anterior or posterior of these mirrors equivalent to dressing in cylindrical surfaces parallel to the plane of the instrument either the anterior face or the posterior face of one or other of these two faces. Again, the position of the elongating-glass placed between the small mirror and the eye being arbitrary, it may be supposed applied on the plain face of one of the lenses composing the telescope equivalent to dressing upon this face of the lens a cylindrical surface parallel to the plane of the instrument and of converting it into a cylindro-spherical lens.

The reflecting-instruments for measuring at night the angular height of the stars above the horizon of the sea, it is better in order to lose as little light as possible, to dispense with the non-silvered part of the small mirror and to give to the Galileo telescope the greatest opening possible.

Having now described the nature of the said invention and in what manner the same is to be performed, I declare that I claim—

1. Elongating perpendicularly to the plane of the reflecting instrument the apparent image from one of the heavenly bodies or objects from which may be measured the angular distance in the manner set forth.

2. The elongating lens or glasses, combined according to the above-described conditions, and in combination therewith the above-described modification of the plane form of mirrors of reflecting-instruments, as set forth.

In testimony whereof I have signed my name to this specification before two subscribing witnesses.

A. LAURENT.

Witnesses:
   P. LABRUERE,
   DUBAS.